(12) United States Patent
Klatt et al.

(10) Patent No.: US 8,954,071 B2
(45) Date of Patent: Feb. 10, 2015

(54) METHOD FOR CONSIDERING THE SUBSCRIBER TYPE IN MOBILITY AND RADIO RESOURCE MANAGEMENT DECISIONS IN A RADIO ACCESS NETWORK

(75) Inventors: Axel Klatt, Köln (DE); Peter Stevens, St. Albans (GB)

(73) Assignee: Deutsche Telekom (UK) Limited, Hatfield, Hertfordshire (GB)

( * ) Notice: Subject to any disclaimer, the term of this patent is extended or adjusted under 35 U.S.C. 154(b) by 472 days.

(21) Appl. No.: 12/522,465

(22) PCT Filed: Jan. 4, 2008

(86) PCT No.: PCT/EP2008/000027
§ 371 (c)(1),
(2), (4) Date: Nov. 11, 2009

(87) PCT Pub. No.: WO2008/083933
PCT Pub. Date: Jul. 17, 2008

(65) Prior Publication Data
US 2010/0124926 A1 May 20, 2010

(30) Foreign Application Priority Data
Jan. 11, 2007 (DE) .......................... 10 2007 002 483

(51) Int. Cl.
*H04W 4/00* (2009.01)
*H04W 36/22* (2009.01)
(Continued)

(52) U.S. Cl.
CPC .............. *H04W 36/22* (2013.01); *H04W 36/24* (2013.01); *H04W 48/18* (2013.01); *H04W 88/06* (2013.01)
USPC .................. 455/435.2; 455/432.1; 455/435.1

(58) Field of Classification Search
CPC ..... H04W 36/00; H04W 36/22; H04W 36/24; H04W 36/34; H04W 36/38; H04W 36/185; H04W 48/18; H04W 88/06; H04W 76/046; H04W 28/08
USPC .......... 455/432.1–432.3, 435.1, 435.2, 452.1, 455/552.1, 553.1, 560
See application file for complete search history.

(56) References Cited

U.S. PATENT DOCUMENTS

| 5,615,249 A | 3/1997 | Solondz |
| 5,884,172 A * | 3/1999 | Sawyer ...................... 455/435.1 |

(Continued)

FOREIGN PATENT DOCUMENTS

| EP | 1 519 607 | 3/2005 |
| EP | 1 835 780 | 9/2007 |

(Continued)

OTHER PUBLICATIONS

T-Mobile: "3FPP TSG RAN WG2'53: Load Sharing using Cell Reselection; Re-061238", 3GPP TSG RAN WG21'53, Shanghai, China, (Online) May 8, 2006 to May 12, 2006, pp. 1-6.

(Continued)

*Primary Examiner* — Wesley Kim
(74) *Attorney, Agent, or Firm* — Faegre Baker Daniels LLP

(57) ABSTRACT

A mobile system where generic information is defined which is applicable per the UE in order to convey subscription related information from the core network to the radio access network which can be used to steer the user to an appropriate cell or for any other Radio Resource Management (RRM) related procedure/decision. It is proposed to define an information element (herein referred as "subscriber type") which allows an indication or pointer to a set of rules which are locally defined in involved nodes (e.g. CN SGSN, MSC, routers etc) and describe the "handling rules" to be applied in the RAN for each user of the mobile system independently.

24 Claims, 1 Drawing Sheet

Example signalling flow of the "subscriber type" information from the CN to the RAN in the IDLE to ACTIVE transition procedure.

(51) Int. Cl.
*H04W 36/24* (2009.01)
*H04W 48/18* (2009.01)
*H04W 88/06* (2009.01)

(56) References Cited

U.S. PATENT DOCUMENTS

| | | | |
|---|---|---|---|
| 6,192,248 | B1 | 2/2001 | Solondz |
| 6,198,937 | B1 * | 3/2001 | DeClerck et al. ............. 455/517 |
| 7,054,661 | B1 * | 5/2006 | Kohli et al. ................... 455/560 |
| 7,200,401 | B1 * | 4/2007 | Hulkkonen et al. .......... 455/438 |
| 7,230,936 | B2 * | 6/2007 | Parekh et al. ................. 370/328 |
| 7,328,010 | B2 * | 2/2008 | Turina et al. ............... 455/426.1 |
| 7,783,299 | B2 * | 8/2010 | Anderson et al. .......... 455/456.1 |
| 7,813,730 | B2 * | 10/2010 | Patel et al. ..................... 455/433 |
| 2002/0110133 | A1 * | 8/2002 | Bern ............................. 370/410 |
| 2002/0193139 | A1 * | 12/2002 | Mildh et al. .................. 455/552 |
| 2005/0153692 | A1 * | 7/2005 | Hwang et al. ................ 455/434 |
| 2006/0014544 | A1 * | 1/2006 | Tolli .............................. 455/453 |
| 2006/0183459 | A1 * | 8/2006 | Kohli et al. ................... 455/405 |
| 2007/0224990 | A1 * | 9/2007 | Edge et al. .................... 455/436 |
| 2007/0276914 | A1 * | 11/2007 | Surlaker et al. ............... 709/206 |
| 2011/0165872 | A1 * | 7/2011 | Ohno et al. ................. 455/432.1 |

FOREIGN PATENT DOCUMENTS

| | | |
|---|---|---|
| JP | 8-237724 | 9/1996 |
| JP | 2004-228905 | 12/2004 |

OTHER PUBLICATIONS

Turina, D. et al.: "Traffic steering and service continuity in GSM-WCDMA seemless networks", Telecommunications, 2005. Contel 2005. Proceedings of rhte 8th International Conference, Zagreb, Croatia, Jun. 15-17, 2005, pp. 77-82.
Examination Report dated Jan. 17, 2013 in corresponding Chinese Application No. 200880002141.X.

* cited by examiner

Example signalling flow of the "subscriber type" information from the CN to the RAN in the IDLE to ACTIVE transition procedure.

subscriber type classes is to simplify the illustration; finer granularity should be expected in practice)

METHOD FOR CONSIDERING THE SUBSCRIBER TYPE IN MOBILITY AND RADIO RESOURCE MANAGEMENT DECISIONS IN A RADIO ACCESS NETWORK

BACKGROUND OF THE INVENTION

With the ongoing standardisation of 3GPP long term evolution (LTE or E-UTRAN) and WiMAX (IEEE802.16) air interfaces, in addition to existing standards (GSM/GPRS and UMTS) an increasing diversity of radio access technologies (RATs) will be present in the future, Operators will require sophisticated mobility mechanisms to simultaneously steer users to appropriate RATs while also spreading the load across the different technologies.

In today's wireless systems like GSM/GPRS or UMTS, typically UE-controlled cell reselection algorithms currently operate independently of any subscriber-specific or service considerations [for UMTS e.g. in 3GPP TS 25.304]. All UEs are handled in the same way based on parameters broadcast on the BCCH [for UMTS e.g. in 3GPP TS 25.331], and hence follow the same cell reselection strategies. Similar as for the idle mode the decision criteria for both mobility related and radio resource related decisions are independent from any subscriber or user type information. So in general the decisions are based on terminal capabilities and to some extent on current service usage or specific information provided by the core network (CN) during the service establishment (e.g so-called "service based handover" which gives an indication from the CN to the RAN that a certain bearer might be handed over to a specific RAT or not). This all relates to the demand of providing similar service equally for all users of the mobile system.

With the advent of a demand for increased data rates and the cost reduction implied by specific tariffs of the mobile operators, an increasing demand is foreseen for user as well as service differentiation, for example in mobility decisions. Qualifying data by means of Quality of Service (QoS) can provide some means to differentiate the subscribers but mobility related decisions (especially while being in idle mode) can't reliably be taken based on this kind of information designed for differentiating traffic of different services using prioritised packet delivery rather than independent tailored to control mobility based upon the type of user.

3GPP has already specified access control classes to restrict access to mobile networks to a set of subscribers belonging to a set of access control classes during severe network congestion. It is proposed that a similar kind of user differentiation is available within the RAN for mobility decisions so that users can be spread appropriately across RATs.

In addition to load distribution across RATs, similar mechanisms may also be required to distribute load across different carriers of different bandwidths on the same RAT.

EP 1 519 607 A1 discloses a method and apparatus for performing radio resource management, wherein the method allows a radio access network to selectively influence the mobility decisions as well as the radio resource control decisions for a specific terminal based on information received from a core network entity.

US 2002/0193139 A1 discloses a method for network/cell/interface selection in mixed networks, wherein a mobile terminal can select different modes of operation, each corresponding to one of a plurality of core networks. The selection is based on selection parameters furnished to the mobile terminal by broadcasting system information or packet system information in the radio cell.

SUMMARY OF THE INVENTION

It is proposed to allow a procedure where an entity of the CN (e.g. aGW in case of SAE/LTE) informs the radio access network (e.g. the eNB in case of LTE/SAE) on registration of a UE or transition from LTE_IDLE to LTE_ACTIVE state about subscriber specific information which in turn should be considered in the radio access network for mobility and radio resource management decisions, both in idle and active mode. The information is preferably defined as an integer number which is associated with the specific handling of the UE defined by a set of rules. These rules will be defined locally in a eNB (or any other involved node) by means of configuration files (e.g. using mainstream data formats like XML, etc) and will be applied by the eNB during the mobility and radio resource management.

DETAILED DESCRIPTION OF THE INVENTION

Figure 1:
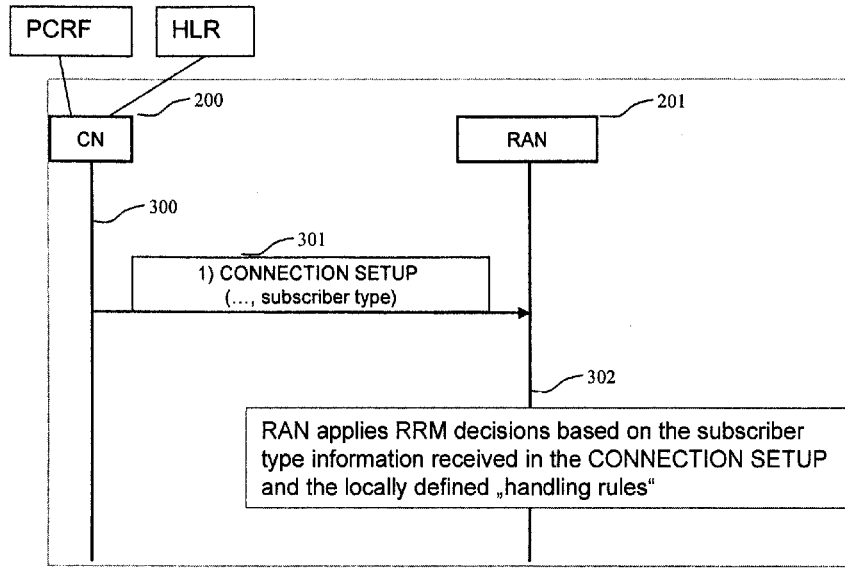
FIG. 1 is a diagram illustrating the flow of information.

The signalling from the CN (200) to the RAN (201) at registration of a UE or during the transition from LTE_IDLE to LTE_ACTIVE state (see FIG. 1) will include a new "Subscriber Type index" information element (in 301) that can be used in mobility or other radio resource management decisions by the network (302). It could also be used to signal towards that UE that the UE has to follow only a specific part of the system information broadcast (on the BCCH) in order to allow user differentiation also in terminal based decisions (e.g. for cell reselection purpose).

Figure 2:
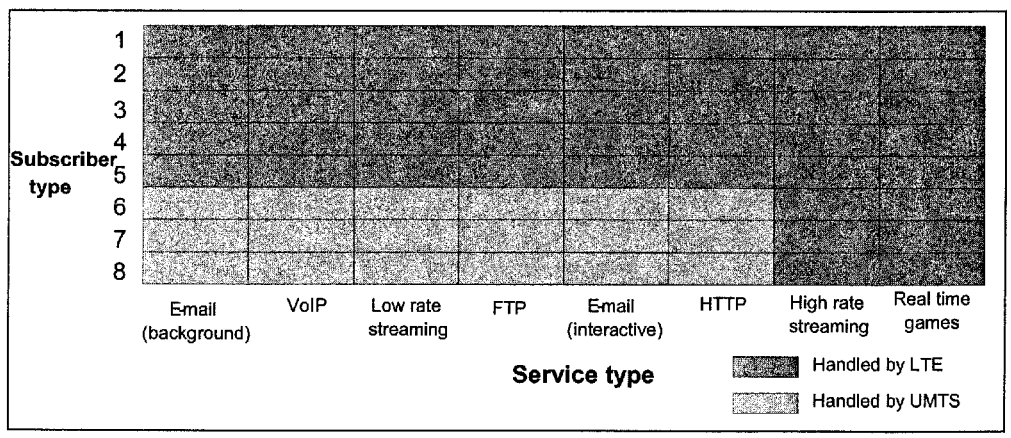
FIG. 2 is a diagram correlating subscriber type to service type.

The coding of the information element should flexible enough to allow its application to a wide range of mobility applications. To allow sufficient granularity it is recommended that at least 16 classes are defined, One example of the use of the subscriber type field for load balancing between UMTS and LTE RATs is shown in FIG. 2. Assuming the LTE load is greater than a certain threshold, it is desirable to spread users across the different RATs based upon both the services used and the subscriber type.

Some services demanding especially high data rates or minimum latency are handled more appropriately on the higher performing LTE RAT, independent of subscriber type. However, the majority of services are well handled on both RATs, and the RAT selection for these is predominantly based upon subscriber type. In this example, 8 classes of subscriber type are shown (number restricted for illustrative purposed only), and for 3 subscriber types. Most services are selected to be handled on the UMTS rather than the LTE RAT. Making subscriber type the dominant criterion rather than service reduces the amount of inter-RAT mobility triggered by different service use, and also allows a more consistent RAT selection policy in IDLE and ACTIVE modes (FIG. 2).

The number of subscriber type classes selected for handling on the UMTS or LTE RATS can be made dependent on the load levels in both RATs. In the case of low LTE load, it is beneficial to handle all users on the better performing LTE RAT. At higher loads, it is possible to alter the number of subscriber type classes directed to the different RATs depending upon the relative load on the two RATs.

Another example of the subscriber type information used in mobility decisions of a cellular network is the case of network sharing or national roaming. In such a case typically on RAT (for example LTE) is shared among different mobile operators while the technologies are not shared due to legacy reasons (e.g. UMTS or GSM). Typically the operator is interested getting its own subscriber back to the subscriber's own network whenever possible. E.g. if the coverage of the shared LTE network is left then its own subscriber should be preferably handed over to the right target network though both might fulfil the requirements for an HO target in terms of radio conditions. In such a case a "subscriber type" indication received from the CN could be used to bring the correct subscriber in the correct network. In today's implementations this requirement can only be fulfilled by the analysis of an operator specific identity available in the RAN (namely the IMSI available in the RNC in UMTS, but not in the BSC of GSM networks). Having an RRM rule defined in the decisions nodes for always performing a handover of subscriber type X (from PLMN B) back to PLMN B whenever possible would be very flexible and could be enhanced/changed depending on any subscription information available in the CN without requiring any change to existing RAN implementations. Also security would benefit from the fact that no subscriber specific information is available in certain nodes of a network which might be vulnerable (e.g. the complete IMSI of a subscriber which can identify his identity). Having only an abstract "subscriber type" information and a defined "handling rule" available would ensure the subscribers' confidentiality in all cases.

Another application for the usage of "subscriber type" information could be related to the specific usage conditions of a terminal in a cellular network. E.g. today in all cellular networks with decision functions in the network/RAN do not have any information how a specific terminal is used. E.g. it is not possible for the network with simple means to detect e.g. if a terminal is a stationary device such as a part of a machine or a wireless gateway router etc. The only means today to get this information is either through introduction of a specific signalling or the usage of radio measurements to determine if a terminal is stationary or not. Specifically the operation of the network with stationary wireless gateway routers (providing access of small home or office wireless networks to the interne) as well as stationary machine-to-machine devices (gas/water meters) could benefit from the additional information about the fact that the device is neither moving nor has strict power constraints as it is typically connected to a fixed power supply: the network can take specific actions for such devices it would not take for the majority of mobile devices in the cellular network. One example could be to apply a specific timer for the LTE_ACTIVE to LTE_IDLE state transitions (which is either done to free resources or to put the device in a state where less power is consumed) or it could completely disable any measurements for mobility to be applied by the device as it would never need to perform a handover to a different cell. The above listed examples are not exclusive. One can consider even more scenarios where such information about the subscriber type could be beneficial.

What is claimed is:

1. A method for operating a radio access network (RAN) to selectively influence the mobility decisions as well as the radio resource control decisions for a specific mobile terminal based on subscriber specific information received from a core network (CN) entity, wherein the subscriber specific information provided from the CN to the RAN comprises a Subscriber Type index identifying one of a plurality of subscriber type classes, and wherein the subscriber specific information is associated with Handling Rules which define the handling of the mobile terminal, wherein the Subscriber Type index points to the Handling Rules locally defined in involved network nodes, wherein the plurality of subscriber type classes are selected for handling on a plurality of radio access technologies (RATs) of the RAN based on relative load levels on the plurality of RATs, wherein for a low load level all mobile terminals associated with RAN are handled on a first RAT and for a high load level the number of subscriber type classes directed to different RATs is altered based on the relative load levels on the plurality of RATs, wherein the subscriber specific information signals to the mobile terminal to follow only a part of system information broadcast on a Broadcast Control Channel (BCCH), the mobile terminal making a cell reselection decision based on the part of the system information broadcast on the BCCH.

2. A method as in claim 1, wherein the CN provides the subscriber specific information to the RAN on registration of a mobile terminal.

3. A method as in claim 1, wherein the CN provides the subscriber specific information to the RAN on transition of a mobile terminal from IDLE to ACTIVE mode.

4. A method as in claim 1, wherein the CN chooses the appropriate Subscriber Type index from information available from a home location register (HLR).

5. A method as in claim 1, wherein the CN chooses the appropriate Subscriber Type index from information available from any instance of the CN.

6. A method as in claim 1, wherein the CN chooses the appropriate Subscriber Type index from information not related to subscription, but related to mobile terminal capabilities.

7. A method as in claim 1, wherein the CN chooses the appropriate Subscriber Type index from information available from another source.

8. A method as in claim 1, wherein the CN chooses the appropriate Subscriber Type index from information depending on the user's choice.

9. A method as in claim 1, wherein the CN chooses the appropriate Subscriber Type index from information available from usage history of the mobile subscriber.

10. A method as in claim 1, wherein a configuration of the Handling Rules is defined locally in each involved node by using a protocol which is used specifically for this purpose.

11. A method as in claim 1, wherein a configuration of the Handling Rules is defined externally by a server and distributed to the involved nodes by means of handling labels.

12. A method as in claim 11, wherein a configuration of the handling labels is defined externally by a server and distributed to the involved nodes by means of XML or any other data format.

13. A method as in claim 1, wherein the Handling Rules depend on subscription information requested from a Home Location Register (HLR) as well as service, load and other radio related information.

14. A method as in claim 1, wherein the Handling Rules depend on subscription information requested from a Policy and Charging Rules Function (PCRF) as well as service, load and other radio related information.

15. A method as in claim 1, wherein the Handling Rules depend on the preference of a user, as well as service, load and other radio related information.

16. A method as in claim 1 where the Handling Rules depend on the history of the user's activity, as well as service, load and other radio related information.

17. A method as in claim 1, where the Handling Rules depend on the type of mobile terminal the user uses, as well as service, load and other radio related information.

18. A method as in claim 1, wherein information of which the part of the system information of the Broadcast Control Channel (BCCH) is relevant is used by the mobile terminal to apply differentiated mobility decisions/procedures as if another part of the information from the BCCH would have been read.

19. A method for operating a radio access network (RAN) to selectively influence the mobility decisions as well as the radio resource control decisions for a specific mobile terminal based on subscriber specific information received from a core network (CN) entity, wherein the subscriber specific information provided from the CN to the RAN comprises a Subscriber Type index identifying one of a plurality of subscriber type classes, and wherein the subscriber specific information is associated with Handling Rules which define the handling of the mobile terminal, wherein the Subscriber Type index points to the Handling Rules locally defined in involved network nodes, and wherein a configuration of the Handling Rules is defined locally in each involved node, wherein the plurality of subscriber type classes are selected for handling on a plurality of radio access technologies (RATs) of the RAN based on relative load levels on the plurality of RATs, wherein for a low load level all mobile terminals associated with RAN are handled on a first RAT and for a high load level the number of subscriber type classes directed to different RATs is altered based on the relative load levels on the plurality of RATs, wherein the subscriber specific information signals to the mobile terminal to follow only a part of system information broadcast on a Broadcast Control Channel (BCCH), the mobile terminal making a cell reselection decision based on the part of the system information broadcast on the BCCH.

20. A radio access network (RAN) for selectively influencing the mobility decisions as well as the radio resource control decisions for a specific mobile terminal based on subscriber specific information received from a core network (CN) entity, wherein the subscriber specific information comprises a Subscriber Type index associated with Handling Rules which define the handling of the mobile terminal, and wherein a configuration of the Handling Rules is defined locally in each involved node, wherein the subscriber specific information is transmitted from the CN to the RAN as a single integer number, the subscriber specific information signaling to the mobile terminal to follow only a part of the system information broadcast on a Broadcast Control Channel (BCCH), wherein the Handling Rules operate during mobility and radio resource management decisions and signal to selective mobile terminals information to selectively read the system information on the Broadcast Control Channel (BCCH) to differentiate the mobile terminals, the mobile terminals making cell reselection decisions based on the selectively read system information on the BCCH.

21. A radio access network as in claim 20, wherein the Handling Rules which operate during mobility and radio resource management decisions according to the Handling Rules for mobile terminals in ACTIVE mode.

22. A radio access network as in claim 20, wherein the Handling Rules operate during mobility and radio resource management decisions according to the Handling Rules for mobile terminals in IDLE mode, wherein the RAN identifies and groups mobile terminals and assigns Handling Rules to those mobile terminals belonging to the same group of subscriber having the same Subscriber Type index.

23. A radio access network as in claim 20, wherein the Handling Rules include different "mobility rules" to allocate different cell reselection parameter sets to different groups of mobile terminals depending on the subscriber information/index available per mobile terminal.

24. A method for operating a radio access network (RAN) to selectively influence the mobility decisions as well as the radio resource control decisions for a specific mobile terminal based on subscriber specific information received from a core network (CN) entity, wherein the subscriber specific information is transmitted from the CN to the RAN as a single integer number, and wherein the subscriber specific information is associated with Handling Rules which define the handling of the mobile terminal, wherein the single integer number points to the Handling Rules locally defined in involved network nodes, wherein the subscriber specific information signals to the mobile terminal to follow only a part of system information broadcast on a Broadcast Control Channel (BCCH), the mobile terminal making a cell reselection decision based on the part of the system information broadcast on the BCCH.

* * * * *